3,383,024
THIRD HAND SOLDERING IRON
William J. Ashworth, Rte. 2,
New Albany, Miss. 38652
Filed Feb. 17, 1966, Ser. No. 528,189
5 Claims. (Cl. 228—53)

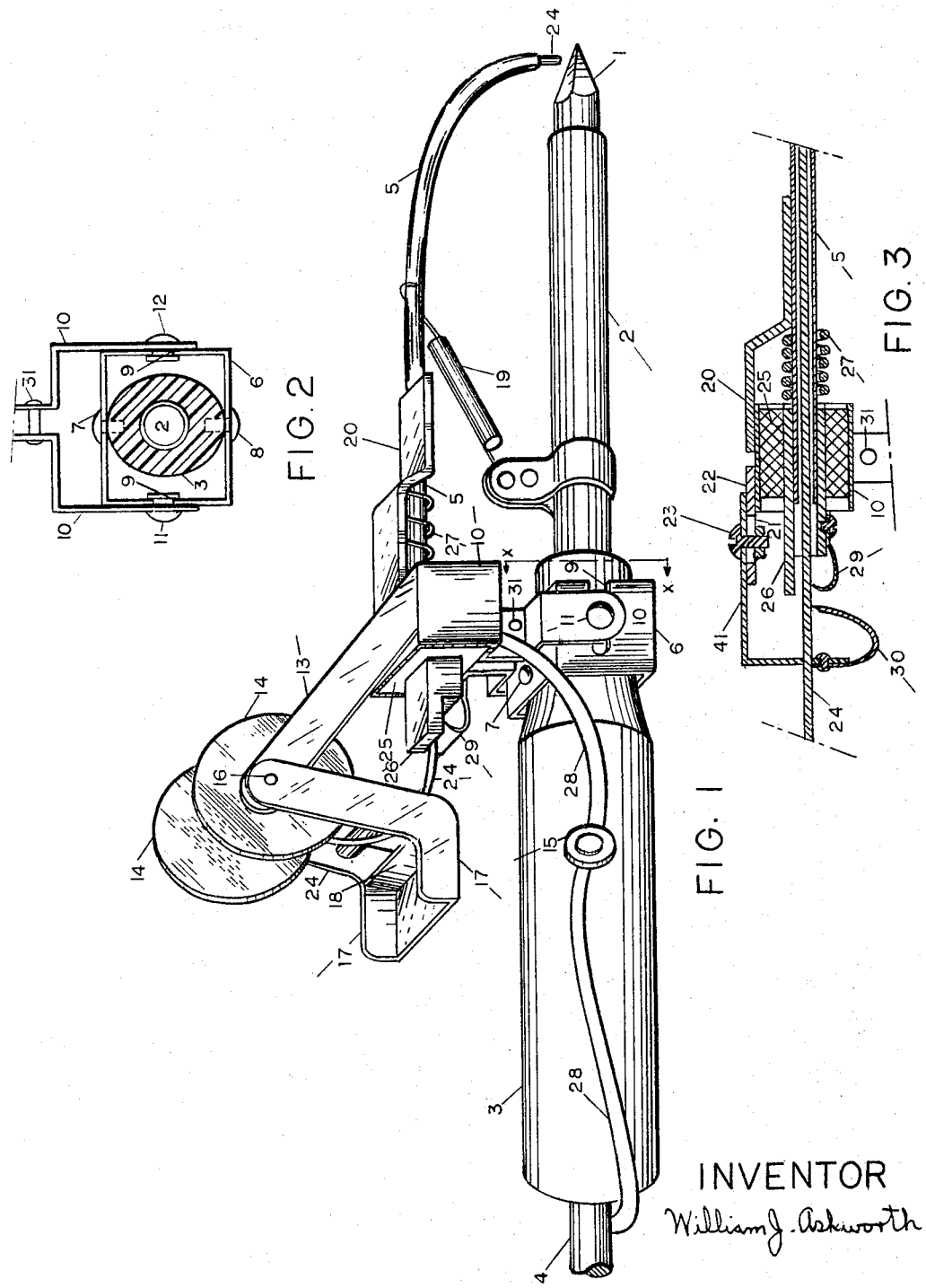

ABSTRACT OF THE DISCLOSURE

A soldering iron to continuously or intermittently feed solder to the soldering iron tip from a universally mounted solder feed device.

---

This invention relates to new and useful improvements in soldering irons.

More specifically, the present invention relates to a soldering iron for continuously feeding solder wire to the iron as the soldering operation is being carried on.

Still further, it is proposed to provide a soldering iron as aforesaid having the solder feed tube universally mounted so as to be able to control the position of the solder feed tube about the tip of the soldering iron so that solder can be delivered to any portion of the heated tip or in proximity to the tip in an area above a plane parallel and adjacent to the lower side of the soldering iron tip as an individual's fingers might do when using a conventional soldering iron.

(1) It is not new to the art to deliver wire solder to the soldering iron tip through a feed tube. Neither is it new for the feed tube to be retractable in one form of the art or to pivot upward from the iron tip in another form of the art.

The present disclosure is new and novel, due to the fact that the solder feed tube is movable in and out, up and away from the iron tip and also can swing from side to side of the iron tip.

This novel method of positioning the solder feed tube allows the operator to deliver solder to any part of the work area with a simple movement of the thumb.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure: FIG. 1 is a perspective side elevation of the soldering iron constructed in accordance with this invention. FIG. 2 is a section on the line x—x. FIG. 3 is a side sectional view of the magnetic solder feed mechanism.

The soldering iron according to the invention comprises the soldering iron tip 1 carried by a bar 2 having a handle 3 on its rear end. The tip 1 is heated in the usual manner by electrical heating means not shown, which are supplied with electrical current through the wire 4 which extends from the handle.

A solder feeding mechanism is universally attached to handle 3 so the solder feed tube 5 may be positioned about the tip 1 in any position desired by the operator.

Bracket 6 is attached to the soldering iron handle 3 with screws 7 and 8.

Bracket 6 can be moved in a back and forth horizontal motion pivoting on screws 7 and 8. Elongated slots 9—9 are located on the sides of bracket 6. Support housing 10 is held in position by guide supports 11 and 12 which are welded to support housing 10 and in turn ride in the elongated slots 9 of the bracket 6. The solder feed tube 5 is welded to bracket 20 and bracket 20 is welded to housing 10. The solder spool bracket 13 is spot welded to the top of the supporting housing 10 which in turn supports solder spool 14. Solder spool 14 is held in place by and rotates on pin 16. The feed tube thumb positioning lever 17 is spot welded to the solder spool bracket 13.

When the soldering iron is held in the hand of the operator, the thumb can control the position of the solder feed tube 5. If the thumb is pressed downward, the solder feed tube 5 swings up and away from the iron tip 1 pivoting on the two guide suppports 11 and 12 in the elongated slots 9—9. When the thumb is moved in a forward directon pressing against flange 18, the solder feed tube is moved in a forward direction, with guide supports 11 and 12 riding forward in slots 9—9. If the thumb is released, spring 19 returns the solder feed tube 5 to its normal position.

Spring 19 is secured to the solder feed tube 5 with a solder joint and positioned at such an angle that it will pull the solder tube 5 downward and rearward.

If the thumb is moved from side to side the solder feed tube will follow this movement pivoting on screws 7 and 8. Again, if the thumb is released, spring 19 will return the solder tube 5 to its normal position. As can be seen, absolute control of the position of the solder feed tube 5 is possible through the use of the disclosed invention.

Prior art has disclosed movable solder feed tubes but all of these prior disclosures have failed to enable the operator to deliver solder to practically any desired position of the soldering iron tip or to the work area around the heated tip almost in the same manner as would be possible when using a conventional soldering iron and using the fingers to deliver the solder.

Previously disclosed art in the field of soldering irons have provided means for delivering solder to the soldering iron tip. This leaves much to be desired as usually the only reason solder is melted on the iron tip is for tinning purposes to facilitate heat transfer to the area where the soldering is to be performed. After the soldering iron tip has been placed against the work area and this work area is heated sufficiently, solder is then applied directly to the joint being soldered, causing the melted solder to flow completely around the connection being made.

When it is possible to apply solder only to the soldering iron tip, it would not be possible to perform an adequate soldering job in most instances.

With the use of my improved soldering iron it is possible to apply solder to the work area in the same manner the fingers would apply the solder.

Another advantage of my improved soldering iron is the ability of the operator to swing the solder feed tube 5 completely away from the soldering iron tip 1 so the tip 1 may enter places where space is at a premium. After the tip 1 is positioned in a close work area such as a television chassis where it may have been necessary to pass the tip 1 through a maze of wires, the solder feed tube 5 can then be brought back into position to feed the solder to the desired location.

The solder feed tube 5 can be positioned with the operator's thumb. If the thumb is pushed forward, it presses against flange 18 causing the solder feed tube to move forward with the entire solder feed mechanism sliding forward on the guide supports 11 and 12 in slots 9—9. This forward movement elongates spring 19. If the operator's thumb is withdrawn, then spring 19 returns the solder feed tube to its original position. If the operator's thumb is depressed, the solder feed tube 5 will swing away and upward from the iron tip 1. When the thumb is released, tube 5 will be drawn back to its original position by spring 19.

If the thumb is pressed against the side flanges of the thumb positioning lever 17, the solder feed tube 5 can be moved from side to side in relation to the soldering iron tip 1 dependent on the side motion of the thumb. When the thumb is released, spring 19 will return the feed tube 5 to its normal position.

It can now be seen that the position of the solder feed tube can be placed in any desired position with relation to the soldering iron tip 5 with a simple movement of the operator's thumb.

Wire solder 24 is coiled on spool 14 and fed through the electromagnetic feeder through the solder feed tube 5 onto or near the soldering iron tip 1, whichever is desired by the operator.

The electromagnetic solder feed mechanism shown in FIG. 3 utilizes a solenoid consisting of a coil of wire 25 consisting of 2000 turns of the #36 magnet wire and wound on a coil form with a ⅜ inch square center hole and a length of ⅜ inch square soft iron 26 having a hole through its center lengthwise for the passage of the wire solder 24.

Spring 27 presses against the end of the soft iron armature 26 and is positioned over feed tube 5 with the feed tube bracket 20 acting as a stop for spring 27. This keeps the armature 26 normally pressed against solder stroke adjusting bracket 41 when in a nonactivated condition. The solenoid feed mechanism is supported by support housing 10 and rivet 31. The length of the travel of armature 26 determines the amount of solder delivered out of feed tube 5 with each action of armature 26. This stroke is adjustable by moving bracket 41 in or out along elongated slot 21 in bracket 22. Bracket 41 is locked in place with screw and nut 23.

When the electric switch 15 is pressed with the operator's finger, an electrical current is caused to pass through wire 28 and coil 25. This causes the solder carriage 26 to move forward. Dog 29 bites into the wire solder and the solder is pulled forward feeding a portion out of the end of tube 5. When switch 15 is released, the electric current is cut off and the solder carriage 26 is returned to its normal position by spring 27. Dog 30 holds the wire solder stationary as the solder carriage 26 returns. Dog 30 as shown in FIG. 3 is not shown in FIG. 1. Successive pressure on switch 15 will deliver any desired amount of solder out of the solder feed tube to the work area.

By referring to FIG. 1, it can be seen that the spool 14 on which the supply of wire solder is coiled, is mounted in a fixed relationship with the solder feed tube 5 and the solder feeding mechanism. The advantage of this lies in the fact that as the solder feed tube 5 is moved, the solder spool 14 also moves in a fixed relationship with the solder feed tube 5. Because of this action the solder is not bent but always remains in a fixed position with the feed tube 5 and the solder feeding mechanism and the solder spool 14. This would not be so if the solder spool 14 were mounted in a stationary position and did not move in a fixed relation with the solder feed tube.

Another advantage of my improved soldering iron is, the ability to feed solder to the work area with a movement of the operator's thumb.

If the feed tube positioning lever 17 is depressed, the solder tube 5 is moved up and away from the tip 1. If, when the solder feed tube 5 is in the position, the switch 15 is pressed several times in succession, a length of solder 24 will be fed out of the end of the solder feed tube 5. By positioning the solder feed tube 5 properly with the thumb, the projecting solder can be fed to the work area in the desired amount by partially releasing the thumb allowing the solder feed tube 5 to be drawn down the desired distance by spring 19, depositing the proper amount of solder on the heated work area.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

I claim:
1. A soldering iron having a heatable soldering tip at one extremity, a solder wire feed means mounted for universal movement on said soldering iron to feed solder to said tip, said wire feed means comprising a solder feed guide extending from said mounting area to the tip area and terminating in an orifice, said orifice being universally positionable to deposit said wire solder in an area surrounding said tip and extending above a plane parallel and adjacent to the side of said tip opposite said feed means.

2. A device according to claim 1 wherein said solder feed guide is rigidly attached to a carriage wherein said carriage is non-rigidly affixed to said soldering iron.

3. A device according to claim 2 wherein said carriage is movable in relation to said soldering iron in a forward or rearward direction, a side to side direction, an up and down direction, or a combination of said directions.

4. A device according to claim 2 wherein said means for delivering said wire solder comprises means to feed said wire solder thru said solder feed guide.

5. A device according to claim 4 wherein a wire solder receptacle is attached to said movable carriage with said receptacle following the same movements as said movable carriage.

References Cited
UNITED STATES PATENTS

| 1,871,009 | 8/1932 | Righter | 228—53 |
| 2,444,267 | 6/1948 | Pereira | 228—53 |

RICHARD H. EANES, JR., *Primary Examiner.*